(12) United States Patent
McKenzie et al.

(10) Patent No.: US 10,334,076 B2
(45) Date of Patent: Jun. 25, 2019

(54) DEVICE PAIRING IN AUGMENTED/VIRTUAL REALITY ENVIRONMENT

(71) Applicant: GOOGLE INC., Mountain View, CA (US)

(72) Inventors: Chris McKenzie, San Francisco, CA (US); Murphy Stein, San Jose, CA (US); Alan Browning, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 134 days.

(21) Appl. No.: 15/438,216

(22) Filed: Feb. 21, 2017

(65) Prior Publication Data

US 2017/0244811 A1 Aug. 24, 2017

Related U.S. Application Data

(60) Provisional application No. 62/298,378, filed on Feb. 22, 2016.

(51) Int. Cl.
*G06T 19/00* (2011.01)
*G06F 3/03* (2006.01)
(Continued)

(52) U.S. Cl.
CPC .......... *H04L 67/38* (2013.01); *G02B 27/017* (2013.01); *G06F 3/011* (2013.01); *G06F 3/017* (2013.01);
(Continued)

(58) Field of Classification Search
CPC ........ H04L 67/38; H04L 67/18; H04W 76/14; G02B 27/017; G02B 2027/0187;
(Continued)

(56) References Cited

U.S. PATENT DOCUMENTS 5,574,479 A * 11/1996 Odell .................... G06F 3/0325 345/158
7,864,159 B2 * 1/2011 Sweetser ............... G06F 3/0346 345/158

(Continued)

FOREIGN PATENT DOCUMENTS

CN 104615344 A 5/2015
JP 2015090530 A 5/2015

OTHER PUBLICATIONS

International Search Report and Written Opinion received for PCT Patent Application No. PCT/US2017/018804, dated May 17, 2017, 14 pages.

(Continued)

*Primary Examiner* — Pablo N Tran
(74) *Attorney, Agent, or Firm* — Brake Hughes Bellermann LLP

(57) ABSTRACT

In a system for pairing a first device and a second device in a virtual reality environment, the first device may be a sending device, and the second device may be a receiving device. The sending device may transmit an electromagnetic signal that is received by the receiving device. The receiving device may process the electromagnetic signal to verify physical proximity of the receiving device and the transmitting device, and extract identification information related to the sending device for pairing. The receiving device may display one or more virtual pairing indicators to be manipulated to verify the user's intention to pair the first and second devices.

20 Claims, 15 Drawing Sheets

(51) Int. Cl.
*H04L 29/06* (2006.01)
*H04L 29/08* (2006.01)
*G06F 3/01* (2006.01)
*H04M 1/725* (2006.01)
*G02B 27/01* (2006.01)
*G06F 3/0346* (2013.01)
*H04W 76/14* (2018.01)

(52) U.S. Cl.
CPC ............ *G06F 3/0346* (2013.01); *H04L 67/18* (2013.01); *H04M 1/7253* (2013.01); *H04W 76/14* (2018.02); *G02B 2027/0187* (2013.01)

(58) Field of Classification Search
CPC ........ G02B 27/0172; G02B 2027/0178; G02B 27/01; G06F 3/011; G06F 3/017; G06F 3/0346; H04M 1/7253; G06T 19/003; G06T 19/006; G06T 2200/04; G06T 19/00
See application file for complete search history.

(56) References Cited

U.S. PATENT DOCUMENTS

| | | | | |
|---|---|---|---|---|
| 9,551,873 | B2* | 1/2017 | Zalewski | G06F 3/01 |
| 9,824,498 | B2* | 11/2017 | Mallinson | G02B 26/10 |
| 2009/0286479 | A1 | 11/2009 | Thoresson et al. | |
| 2010/0066821 | A1 | 3/2010 | Rosener et al. | |
| 2011/0028091 | A1 | 2/2011 | Higgins et al. | |
| 2013/0141325 | A1 | 6/2013 | Bailey | |
| 2013/0278635 | A1* | 10/2013 | Maggiore | G06T 19/006 345/633 |
| 2014/0168261 | A1* | 6/2014 | Margolis | G06F 3/011 345/633 |
| 2014/0273849 | A1 | 9/2014 | Lee et al. | |
| 2014/0333665 | A1 | 11/2014 | Sylvan et al. | |
| 2014/0362110 | A1* | 12/2014 | Stafford | G06F 3/013 345/633 |
| 2015/0029942 | A1 | 1/2015 | Chen et al. | |
| 2015/0235426 | A1* | 8/2015 | Lyons | G02B 27/0172 345/8 |
| 2015/0346492 | A1 | 12/2015 | Kim | |
| 2016/0037573 | A1 | 2/2016 | Ko et al. | |
| 2016/0292922 | A1* | 10/2016 | Kasahara | G06F 3/1454 |
| 2017/0011553 | A1* | 1/2017 | Chen | G06F 3/005 |
| 2017/0069134 | A1* | 3/2017 | Shapira | G06F 3/011 |
| 2018/0247424 | A1* | 8/2018 | Bleyer | G06T 7/593 |
| 2018/0262717 | A1* | 9/2018 | Imaoka | H04N 7/157 |

OTHER PUBLICATIONS

Office Action for Japanese Application No. 2018-544129, dated Mar. 19, 2019, 3 pages.

* cited by examiner

DEVICE PAIRING IN AUGMENTED/VIRTUAL REALITY ENVIRONMENT

CROSS REFERENCE TO RELATED APPLICATION

This application is a Non-Provisional of, and claims priority to, U.S. Provisional Application No. 62/298,378, filed on Feb. 22, 2016, the disclosure of which is incorporated by reference herein in its entirety.

FIELD

This application relates, generally, to pairing of electronic devices in a virtual and/or augmented reality environment.

BACKGROUND

An augmented reality (AR) system and/or a virtual reality (VR) system may generate a three-dimensional (3D) immersive virtual environment. A user may experience this 3D immersive virtual environment through interaction with various electronic devices. For example, a helmet or other head mounted device including a display, glasses or goggles that a user looks through when viewing a display device may provide audio and visual elements of the 3D immersive virtual environment to be experienced by a user. External computing devices, such as, for example, external handheld devices such as one or more controllers, gloves fitted with sensors, and other such electronic devices, may be paired with the head mounted device, allowing the user to move through and interact with elements in the virtual environment through manipulation of the external computing device.

SUMMARY

In one aspect, a computer implemented method may include detecting, by a first device, a signal transmitted by a second device; processing, by a processor of the first device, the signal to detect a relative proximity of the first device and the second device; generating, by the first device, a virtual pairing indicator based on the processing of the signal; detecting and tracking a position and orientation of the second device relative to the virtual pairing indicator based on the signal transmitted by the second device; and operably coupling the first device and the second device based on the detecting and tracking of the position and orientation of the second device relative to the virtual pairing indicator.

In another aspect, a computing device may include a first device configured to generate a virtual environment. The first device may include a memory storing executable instructions, and a processor configured to execute the instructions. Execution of the instructions may cause the computing device to detect a signal transmitted by a second device; process the signal to verify a relative proximity of the first device and the second device; generate a virtual pairing indicator based on the processing of the signal; detect and track a position and orientation of the second device relative to the virtual pairing indicator based on the signal transmitted by the second device; and operably couple the first device and the second device based on the tracked position and orientation of the second device relative to the virtual pairing indicator.

The details of one or more implementations are set forth in the accompanying drawings and the description below. Other features will be apparent from the description and drawings, and from the claims.

DETAILED DESCRIPTION

A user immersed in an augmented reality environment and/or a virtual reality environment wearing a first electronic device, for example, a head mounted display (HMD) device may explore the 3D virtual environment and interact with the virtual environment through various different types of inputs. These inputs may include, for example, physical interaction including, for example, manipulation of a second electronic device separate from the HMD, manipulation of the HMD itself, and/or through hand/arm gestures, head movement and/or head and/or eye directional gaze and the like. The first and second electronic devices may be operably coupled, or paired, to facilitate communication and data exchange between the first and second electronic devices, and to transmit user inputs received at the second electronic device to the first electronic device.

A system and method, in accordance with implementations described herein, may facilitate the establishing of a connection between a first electronic device, such as, for example, an HMD that generates a virtual environment to be experienced by the user, and a second electronic device, such as, for example, a controller that may receive user input for interaction in the virtual environment generated by the HMD, allowing the two devices to communicate and exchange information. A system and method, in accordance with implementations described herein, may facilitate this operable coupling between the two devices based on information included in signals emitted by one of the HMD or the controller, and received by the other of the HMD or the controller. These signals may include, for example, electromagnetic signals, acoustic signals, and/or other types of signals which may provide information related to, for example, relative position and/or orientation of the device(s), and/or relative proximity of the device(s). The information included in these types of signals may, for example, allow the system to detect physical proximity of the two devices, to positively confirm the user's intention to establish communication between the two devices, or pair the two devices, and to proceed with securely pairing the two devices without some of the manual user inputs which may otherwise complicate the pairing process and detract from the user's enjoyment of the virtual experience. Hereinafter, simply for ease of discussion, this type of operable coupling between two electronic devices to establish communication and allow for exchange of information between the two devices during operation, will be referred to as pairing.

Figure 1:
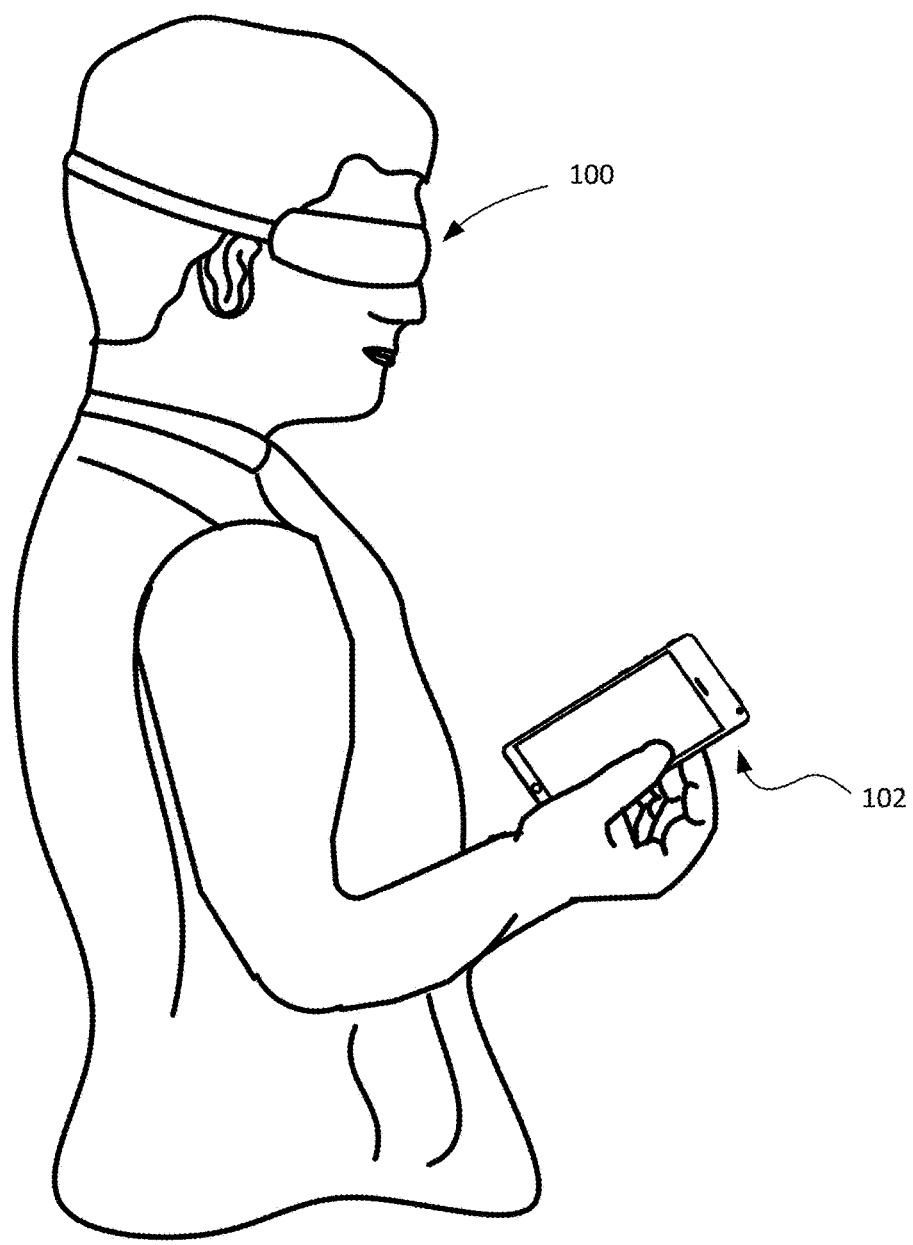
FIG. 1 is an example of an augmented and/or virtual reality system including a head mounted display device and a controller, in accordance with implementations as described herein.

In the example implementation shown in FIG. 1, a user wearing an HMD 100 is holding a portable controller 102. The controller 102 may be, for example, a game controller, a smartphone, a joystick, or another portable electronic device that may be operably coupled to, or paired with, and communicate with, the HMD 100. While in the example shown in FIG. 1, only one controller 102 is illustrated (simply for ease of discussion and illustration), two (or more) additional external devices may be paired with/interact with the HMD 100 in the virtual environment. During operation (after pairing) the controller 102 (and/or other external devices) may communicate with the HMD 100 via, for example, a wired connection, or a wireless connection such as, for example, a WiFi or Bluetooth connection, or other communication mode available to both devices to exchange information and facilitate the translation of a user input at the controller 102 into a corresponding interaction in the immersive virtual environment generated by the HMD 100.

In some instances, in order to securely pair the HMD 100 and the controller 102 for communication and operation in the virtual environment, one of the HMD 100 or the controller 102 may scan and detect other devices within a given communication range, eligible for pairing, and device pairing may be carried out after a user selects a particular device, enters authorization codes, and authorizes pairing. For example, the HMD 100 may display a list of devices eligible for pairing (for example, from a saved list of previously paired devices, from a saved list of eligible devices, from a scan searching for eligible devices within a given range, and/or a combination thereof). The user may scroll through the list to select a device, for example, the controller 102, to initiate pairing. The user may then be prompted to enter a passcode for authentication and verification of the controller 102, and/or other types of information, before the pairing may be carried out and communication is established between the HMD 100 and the controller 102. In some instances, the devices included on the list presented to the user may not be intuitively named, such that identification of a particular device may be difficult, and/or passcodes required for authentication may not always be readily available to the user and/or may be difficult or cumbersome to enter. This process may be time consuming, may be prone to error, and may detract from the user's experience in the virtual environment. A signal, such as, for example, an electromagnetic signal or an acoustic signal, transmitted by one of the HMD 100 or the controller 102 and received by the other of the HMD 100 or the controller 102, may allow for detection of a relative position and/or orientation of the HMD 100 and the controller 102. This may allow for detection and/or verification of physical proximity of the HMD 100 and the controller 102 (rather than selection from a list of devices), and authentication based on correspondence between, for example, a set gesture and position/pose of the controller 102 relative to the HMD 100 (rather than entry of a more complicated passcode that may not be readily accessible to the user).

Figure 2A:
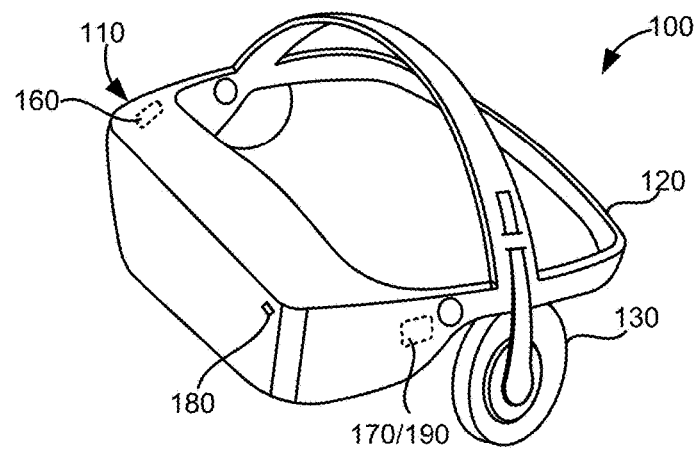
FIGS. 2A and 2B are perspective views of an example head mounted display device.
Figure 2B:
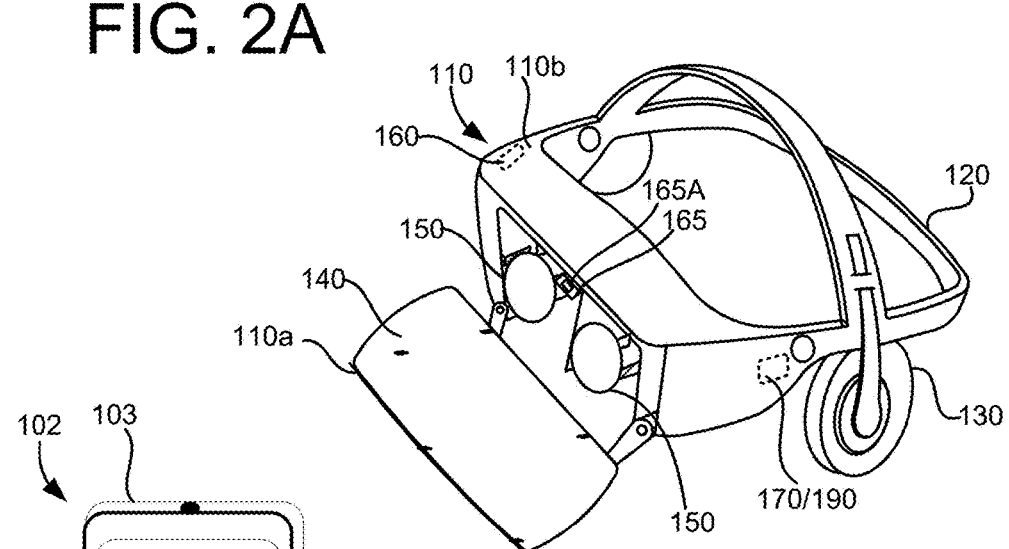
Figure 2C:
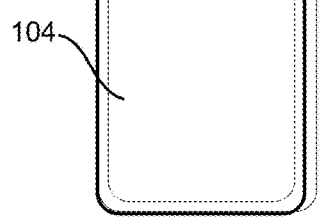
FIG. 2C illustrates an example controller, in accordance with implementations as described herein.
Figure 3:
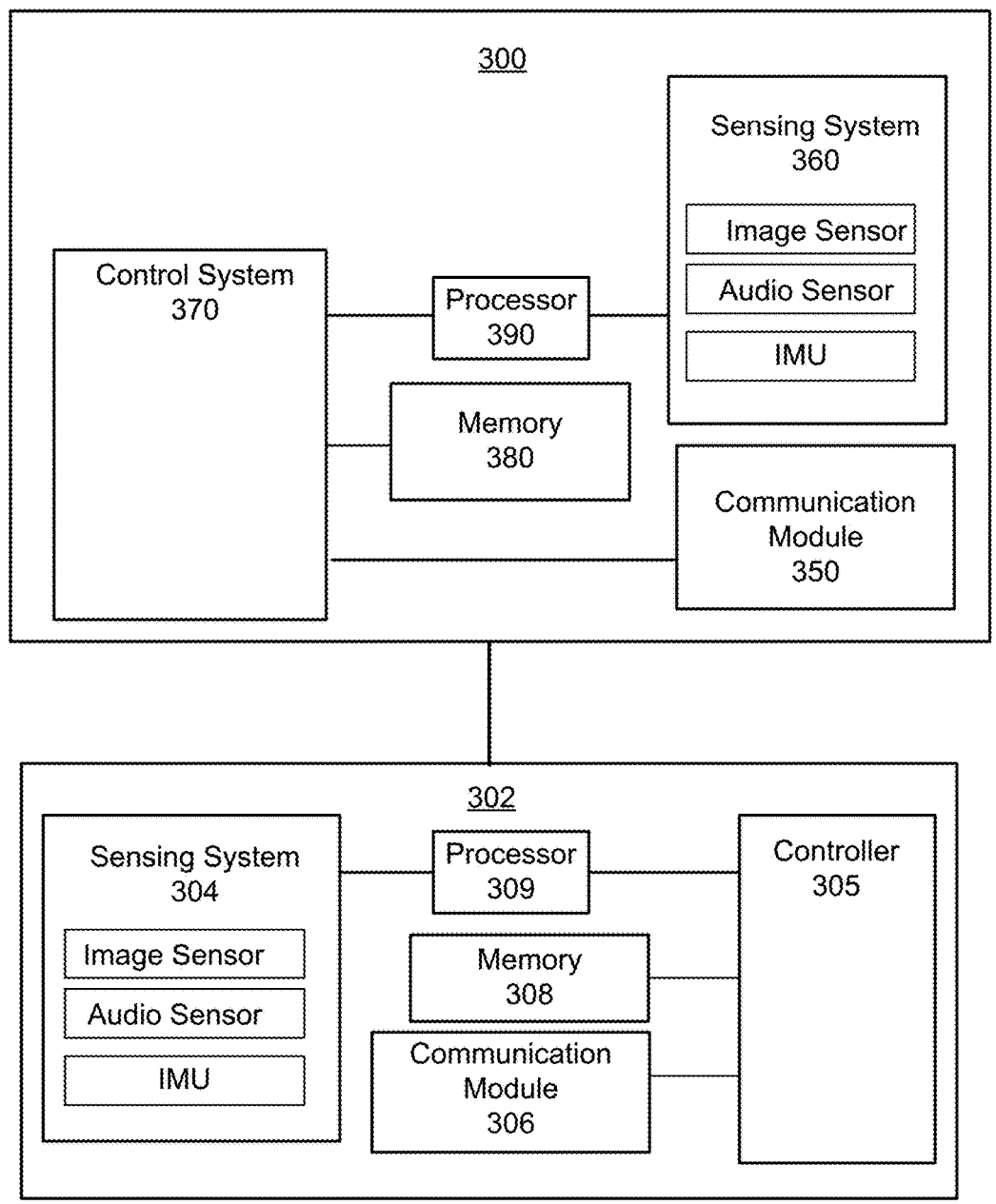
FIG. 3 is a block diagram of a head mounted electronic device and a controller, in accordance with implementations as described herein.

FIGS. 2A and 2B are perspective views of an example HMD, such as, for example, the HMD 100 worn by the user in FIG. 1, and FIG. 2C illustrates an example controller, such as, for example, the controller 102 shown in FIG. 1. FIG. 3 is a block diagram of an augmented reality and/or a virtual reality system including a first electronic device 300 in communication with a second electronic device 302. The first electronic device 300 may be, for example an HMD as shown in FIGS. 1, 2A and 2B, generating an immersive virtual environment, and the second electronic device 302 may be, for example, a controller as shown in FIGS. 1 and 2C. As noted above, the first electronic device 300 and the second electronic device 302 may be paired to establish communication between the devices and facilitate user interaction with virtual objects, features, elements and the like in the virtual environment.

In a system and method for pairing two different electronic devices using, for example, electromagnetic signals or acoustic signals, one of the electronic devices may be a sender, transmitting the signal(s), and the other of the electronic devices may be a receiver, receiving the transmitted signal(s). Simply for ease of discussion and illustration, hereinafter, examples will be presented in which the controller 102 is the sender of the (for example, electromagnetic and/or acoustic) signal(s), and the HMD 100 is the receiver of the (for example, electromagnetic and/or acoustic) signal(s), with the received signal(s) being used by the HMD 100 to detect (and, in some implementations, track) the three-dimensional position and orientation of the controller 102 relative to the HMD 100. However, in some implementations, the HMD 100 may be the sender, transmitting (for example, electromagnetic and/or acoustic) signal(s) to be received by the controller 102 for detecting a three-dimensional relative position and orientation of the HMD 100 and the controller 102. In some implementations, the HMD 100 may both send and receive (for example, electromagnetic and/or acoustic) signal(s), and the controller 102 may both send and receive (for example, electromagnetic and/or acoustic) signal(s).

As noted above, the system may detect and track at least one of the position and/or the orientation of an electronic device operating in the system in a variety of different manners. For example, in some implementations, the system may detect and track a six degree of freedom (6DOF) position and orientation, or pose, of an electronic device, such as, for example, the controller 102, based on acoustic signals emitted by the transmitting device, or transmitter, or sender, and received by the receiving device, or receiver. For example, the transmitting device may emit spread spectrum acoustic signals, for example, spread spectrum ultrasonic signals. The spread spectrum signals emitted by the transmitting device may generate an acoustic signature associated with characteristics of the transmitting device at the point in time at which the signals are generated. These spread spectrum signals may be detected, or received by the receiving device. A 6DOF pose of the transmitting device, and/or a relative position and orientation of the transmitting device and the receiving device, may be determined based on the acoustic signature associated with these acoustic signals In some implementations, the system may detect and track the position and orientation, or 6DOF pose, of an electronic device, such as, for example, the controller 102, based on electromagnetic signals emitted by the transmitting device, or transmitter, or sender, and received by the receiving device, or receiver. Hereinafter, simply for ease of discussion and illustration, 6DOF tracking of electronic devices, as it related to the principles associated with the pairing of devices to be described, will be discussed with respect to the transmission and receipt of electromagnetic signals. However, the principles to be described herein may be applied in situations in which 6DOF tracking of electronic devices is accomplished in other manners, such as, for example, based on acoustic signals. Further, while principles may be described with respect to examples in which 6DOF tracking of electronic devices is applied, these principles may also be applied in which the system detects and tracks, for example only a position of the electronic device(s), and/or only the orientation of the electronic device(s).

Figure 4:
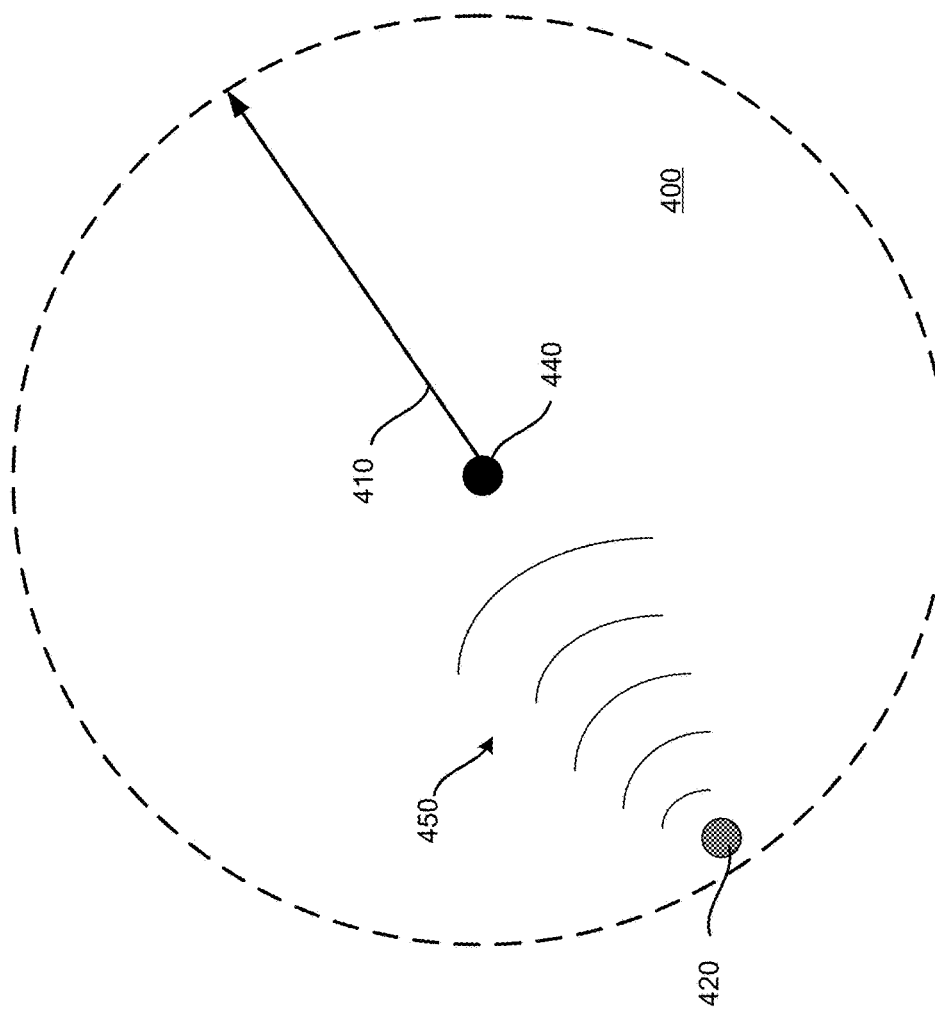
FIG. 4 illustrates a detection area and a detection range of a sender and a receiver of a system, in accordance with implementations as described herein.

An electromagnetic signal transmitted by, for example, the controller 102 and/or the HMD 100 may be represented in the form of an electromagnetic wave having synchronized oscillations of electric and magnetic fields. The electronic wave component and the magnetic wave component of the electromagnetic signal may be in phase, and directionally oriented perpendicular, or 90 degrees, to each other. As shown in FIG. 4, the properties of an electromagnetic signal 450, transmitted by the sender 420 and detected by the receiver 440, may be processed by the receiver 440 to detect the presence of the sender 420 within a particular detection area 400, or range 410, and/or to detect the position and orientation of the sender 420 relative to the receiver 440. In the example shown in FIG. 4, the detection area 400 is illustrated as a circle surrounding the receiver 440, with the detection range 410 illustrated by a radius of the circle, with the receiver 440 at the center of the circle, or detection area 440, simply for ease of discussion and illustration. In this manner, transmission of electromagnetic signal(s) from the controller 102 may be received by the HMD 100, and processed by the HMD 100 to detect the presence of the controller 102 within the detection range of the HMD 100, indicating physical proximity of the HMD 100 and the controller 102, and a position and orientation of the controller 102 relative to the HMD 100. Continuous transmitting, receiving and processing of electromagnetic signal(s) in this manner may provide for of six-degree-of-freedom tracking of the controller 102 relative to the HMD 100 as the user experiences the virtual environment. The properties associated with electromagnetic waves may render the transmission and detection of electromagnetic signals in this manner particularly reliable within a relatively short range, such as, for example, a representative distance between the HMD 100 worn on the user's head and the controller 102 held in the user's hand (i.e., approximately an arm's length).

In response to the detection of the controller 102 (the sender, in this example) within the detection range as described above, the HMD 100 (the receiver, in this example) may initiate a process to pair the HMD 100 and the controller 102, including verification of the user's intention to pair the detected controller 102 with the HMD 100. This will be described in more detail with reference to FIGS. 5A-5D.

As noted above, an augmented and/or virtual reality system, in accordance with implementations as described herein, may include numerous different electronic devices in communication with each other, including, or instead of, the HMD 100 and the controller 102 described above. Hereinafter, the HMD 100 and the controller 102 will serve as example electronic devices to be paired, simply for ease of discussion and illustration. In the following example implementations, it will be assumed that the system, for example, the HMD 100 and the controller 102 operating in the system, is in a pairing mode. In some implementations, the system may always, be in the pairing mode, with the system always searching for devices eligible for pairing. In some implementations, the pairing mode may be initiated in response to a user input requesting pairing. In some implementations, the pairing mode may be initiated by the system when executing an application in need of a companion device, such as a controller, for effective user interaction in the application. In some implementations, the pairing mode may be initiated each time the system is brought into an operational state. The pairing mode may be initiated in numerous other ways, and/or in response to numerous other inputs and/or factors. In the following example implementations, it will be assumed, simply for ease of discussion, that the pairing mode has been initiated in some manner compatible with the particular system.

In the example shown in FIGS. 5A-5D, the left side of each figure illustrates a third-person view of the user wearing the HMD 100 and holding the controller 102, and the right side of each figure illustrates a first person view of an example virtual scene 600 which may be viewed by the user in the virtual environment generated by the HMD 100. In FIGS. 5A-5D, the controller 102 is illustrated in the example virtual scene 600, simply for ease of explanation. In some implementations, a virtual rendering of the controller 102 may be included in the virtual scene 600 viewed by the user, or a pass through image of the controller 102 may be displayed to the user in the virtual scene 600, to provide the user with an indication of the position and/or orientation of the controller 102 with respect to virtual objects in the virtual environment generated by the HMD 100 and displayed to the user on, for example, the display 140 of the HMD 100.

Figure 5A:
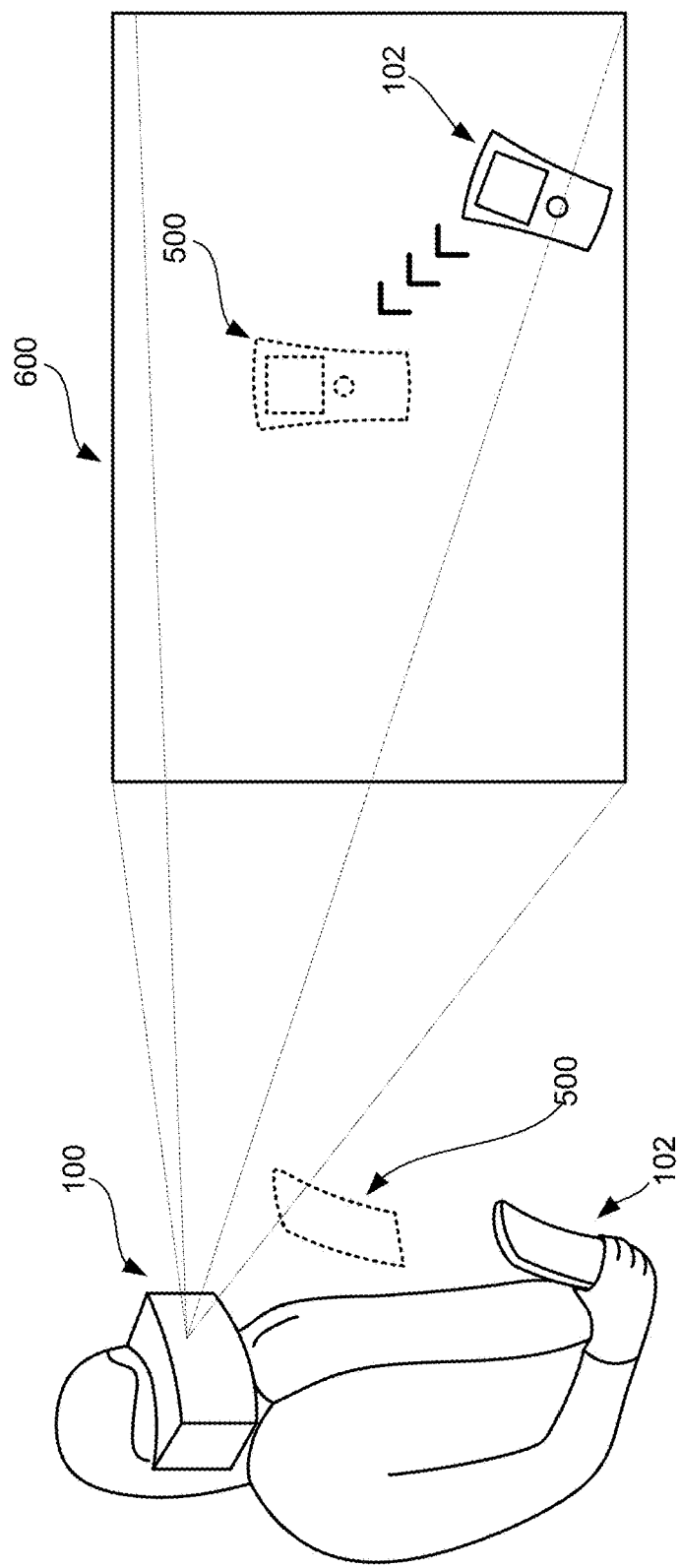
FIGS. 5A-5D illustrate pairing of a first device and a second device in an augmented and/or a virtual reality environment, in accordance with implementations as described herein.
Figure 5B:
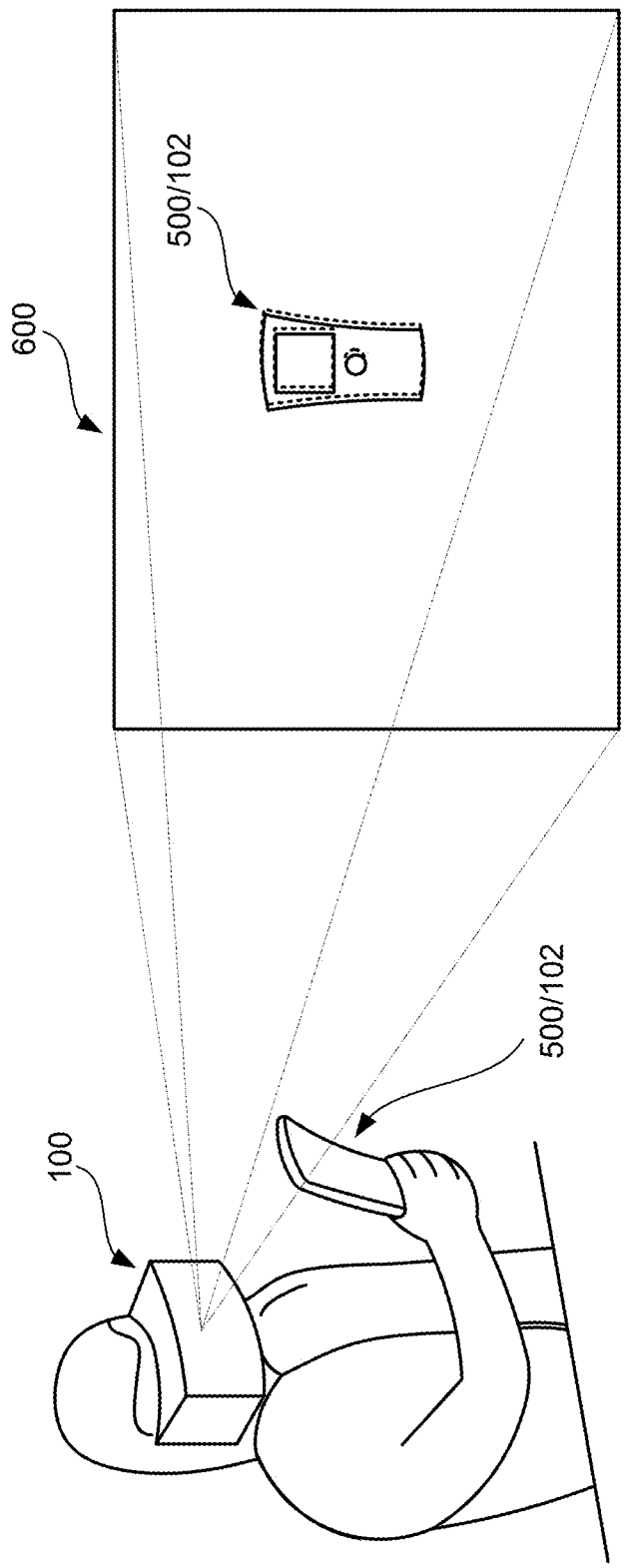

As shown in FIG. 5A, the receiver, or HMD 100, may detect an electromagnetic signal generated by the sender, or controller 102. The properties associated with the electromagnetic signal may provide an indication of physical proximity of the controller 102 to the HMD 100, in addition to three dimensional position and orientation of the controller 102 with respect to the HMD 100. In response to detection of the controller 102 in the detection range of the HMD 100, a virtual pairing indicator 500, for example, a rendered image corresponding to the controller 102 and displayed to the user as a virtual object in the virtual environment, may indicate to the user that the controller 102 is within the detection range and available for pairing with the HMD 100. The rendered image may be, for example, a three dimensional rendered image that is displayed as a virtual object in the virtual environment generated by the HMD 100. In response to the virtual pairing indicator 500, the user may initiate movement of the controller 102 toward the virtual pairing indicator 500, as shown by the arrows in FIG. 5A, until the controller 102 is substantially aligned with the virtual pairing indicator 500, as shown in FIG. 5B. The rendered image may define a virtual alignment area for alignment of the controller 102 in the pairing process. Displaying of the virtual rendered image of the virtual alignment area as a virtual object in the virtual environment may allow the user, wearing the HMD 100, to control the position and orientation of the controller 102 as the user moves the controller 102 in the physical space, to bring and maintain the controller 102 into alignment with the virtual pairing indicator 500, in order to meet and achieve set verification criteria to complete the pairing process. In this manner, pairing may be achieved between the HMD 100 and the controller 102, while pairing with other devices which may be in physical proximity of the HMD 100 may be avoided. In some implementations, the set verification criteria, confirming that the devices (i.e., the HMD 100 and the controller 102) are to be paired, may be met/achieved by aligning the controller 102 in the virtual alignment area or series of virtual alignment areas, maintaining alignment of the controller in the virtual alignment area for a set amount of time, and the like. Upon detection of a verification input, for example, the detected alignment of the controller 102 in the virtual alignment area, for example, for the set amount of time, the pairing process may be completed.

The controller 102 is illustrated in the example shown in FIGS. 5A-5B, to provide clarity in explanation. As noted above, in some implementations, such as, for example, in a virtual reality environment, a virtual rendering of the controller 102 may be displayed to the user as a virtual object, together with the virtual pairing indicator 500, in the virtual reality environment generated by the HMD 100 and displayed to the user in the virtual scene 600 viewed by the user. In some implementations, a pass through image of the controller 102 may be displayed to the user, together with the virtual pairing indicator 500. In some implementations, such as, for example, in an alternate/mixed reality environment, the controller 102 may be visible through the HMD 100, together with the virtual pairing indicator 500.

In some implementations, the virtual pairing indicator 500 may be in the form of, for example, a closed curve shape. In some implementations, the virtual pairing indicator 500 may be in the form of, for example, one or more indexing and/or alignment markers. In some implementations, the virtual pairing indicator 500 may be, for example, a three-dimensional stylized rendered image that indicates a virtual zone in which the controller 102 may be aligned. In some implementations, the visual representation of the virtual pairing indicator 500 may include one or more features corresponding to the detected controller 102, so that, for example, a contour of the virtual pairing indicator 500 matches a contour of the controller 102 as closely as possible, and the like. This may allow for more positive verification of intentional pairing of the controller 102 with the HMD 100.

In some implementations, the electromagnetic signal generated by the controller 102 may be modulated to include identification information related to the sender (the controller 102 in this example). This identification information may allow the system to, for example, more accurately render a visual representation of the controller 102 for the virtual pairing indicator 500, select a compatible communication protocol, and the like.

In some implementations, the controller 102 may be detected, and the movement of the detected controller 102 may tracked by the system. In some implementations, the user's hand may be detected and tracked by the system, in addition to, or instead of, the controller 102. This may allow an image of the detected controller 102 (and hand) to be rendered as the controller moves 102 toward the virtual pairing indicator 500, and the rendered image of the controller 102 (and hand) to be displayed together with the virtual pairing indicator 500 in the virtual environment. In some implementations, the virtual pairing indicator 500 may be superimposed on an image of the user's hand and controller 102, as well as, for example, a corresponding portion of the physical environment, captured by a pass through camera provided on the HMD 100 and displayed to the user.

Figure 5C:
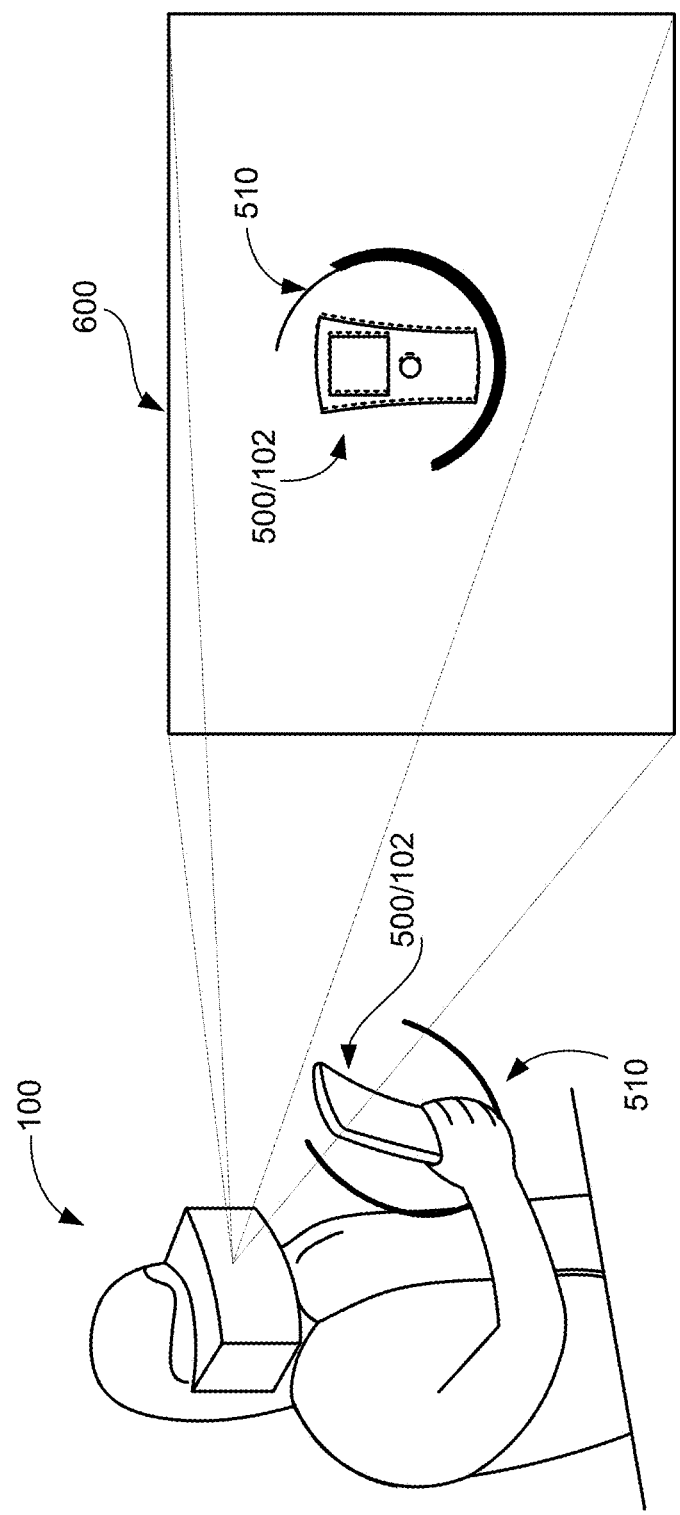
Figure 5D:
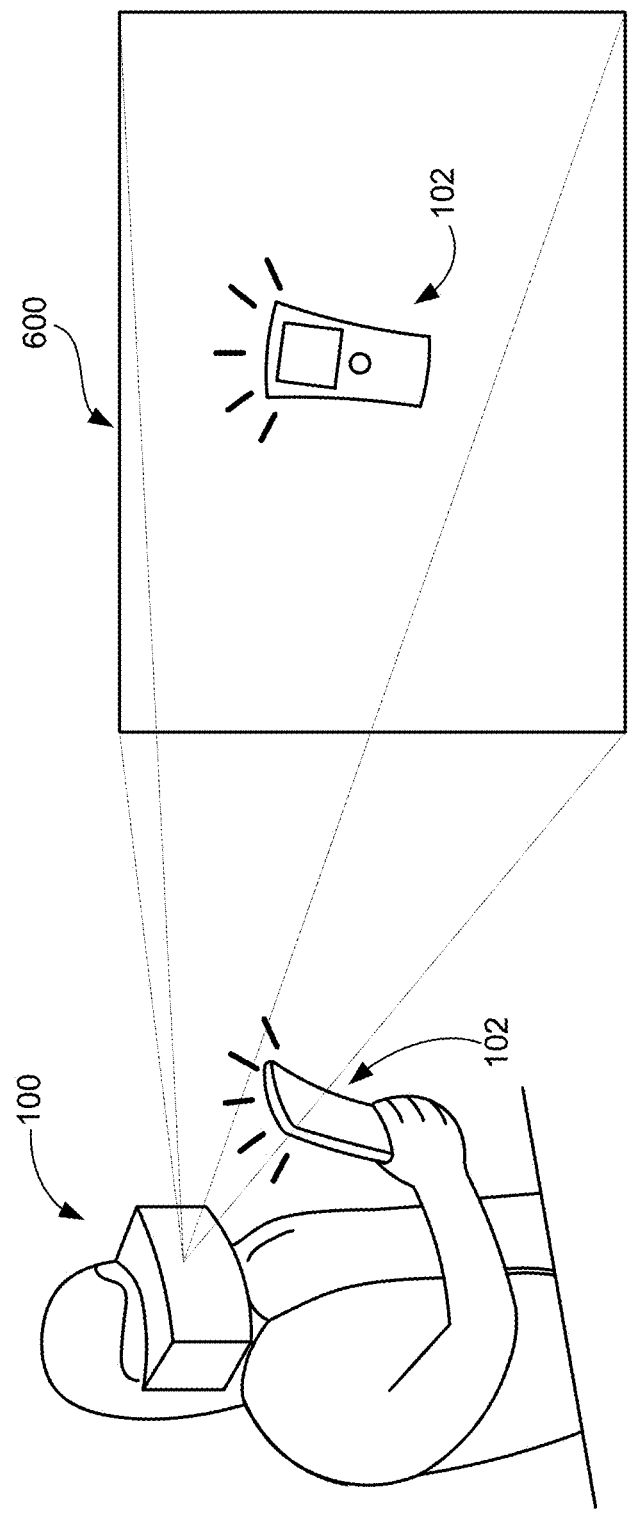

The user may confirm that the movement of the controller 102 toward the virtual pairing indicator 500 and alignment of the controller 102 with the virtual pairing indicator 500 is intentional, and may verify the intention to proceed with pairing of the HMD 100 and the controller 102, based on, for example, previously set verification criteria. This verification criteria may include, for example, maintaining the aligned position of the controller 102 and the virtual pairing indicator 500 for a previously set amount of time, as shown in FIG. 5C. In some implementations, a virtual progress indicator 510 may be displayed to the user in the virtual environment. The virtual progress indicator 510 may provide a visual indication to the user of, for example, how much of the set time for verification has elapsed. After the set amount of time has elapsed, with the controller 102 aligned with the virtual pairing indicator 500, the HMD 100 and controller 102 may be paired, enabling communication between the HMD 100 and the controller 102 as described above via, for example, Bluetooth, WiFi, or other communication available to the HMD 100 and the controller 102.

In a system and method for pairing the controller 102 and the HMD 100 as described above, the electromagnetic signal may include a position and orientation vector identifying the controller 102 in physical proximity of the HMD 100. The movement and sustained alignment of the controller 102 with the virtual pairing indicator 500 may allow for verified, secure pairing of the controller 102 and the HMD 100 without requiring the user to, for example, select a device to be paired from a list of devices which may be difficult to identify (based on, for example, nomenclature associated with the devices included on the list), and/or to access and enter passcodes and the like for authentication.

Additionally, the pairing of the controller 102 and the HMD 100 in this manner may provide a more reliable indicator of physical proximity of the controller 102 and the HMD 100 when compared to, for example, relying on a received signal strength indicator (RSSI) associated with a Bluetooth beacon. That is, a first (source) device may include a first Bluetooth emitter, and a second (source) device may include a second Bluetooth emitter that is stronger than the first Bluetooth emitter. In some situations, the relatively higher strength of the second Bluetooth emitter may result in a higher RSSI detected for the second (source) device by a receiving device, even though the first (source) device (having a weaker RSSI) may be in closer physical proximity to the receiving device. Thus, in some instances, RSSI may not be a reliable indicator of relative physical proximity of devices. Further, a Bluetooth beacon emitted by a source device may include non-user identifiable information, leading to erroneous device selection, and failed pairing.

In contrast, in a system and method in accordance with implementations described herein, 6DOF pose information derived from the received electromagnetic signal (or the received acoustic signal as described above) may be used to verify, to both the transmitting device and the receiving device, that the transmitting and receiving devices are essentially co-located. Modulation of the electromagnetic signal to include identification information may allow the receiving device to positively identify the transmitting device as a known device eligible for pairing. Sustained alignment of the virtual image of the transmitting device with the virtual pairing indicator may provide positive verification of the user's intention to pair the transmitting and receiving devices. This may provide a more secure and simplified pairing process, and the less complicated pairing process may improve the user's experience in the virtual environment.

Figure 6A:
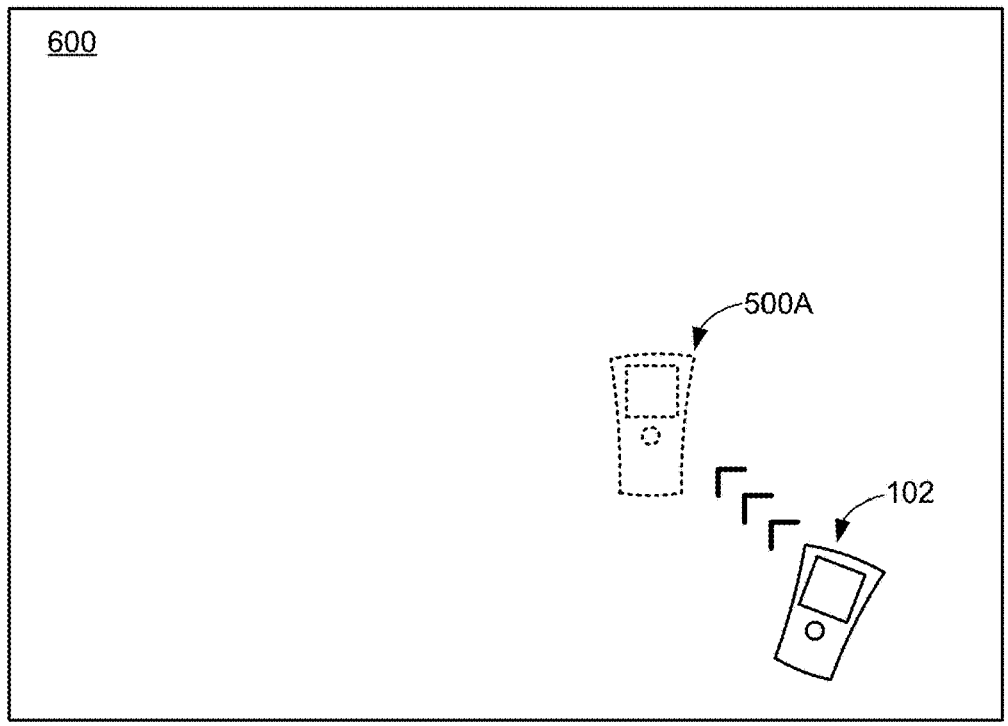
FIGS. 6A-6I illustrate pairing of a first device and a second device in an augmented and/or a virtual reality environment, in accordance with implementations as described herein.
Figure 6B:
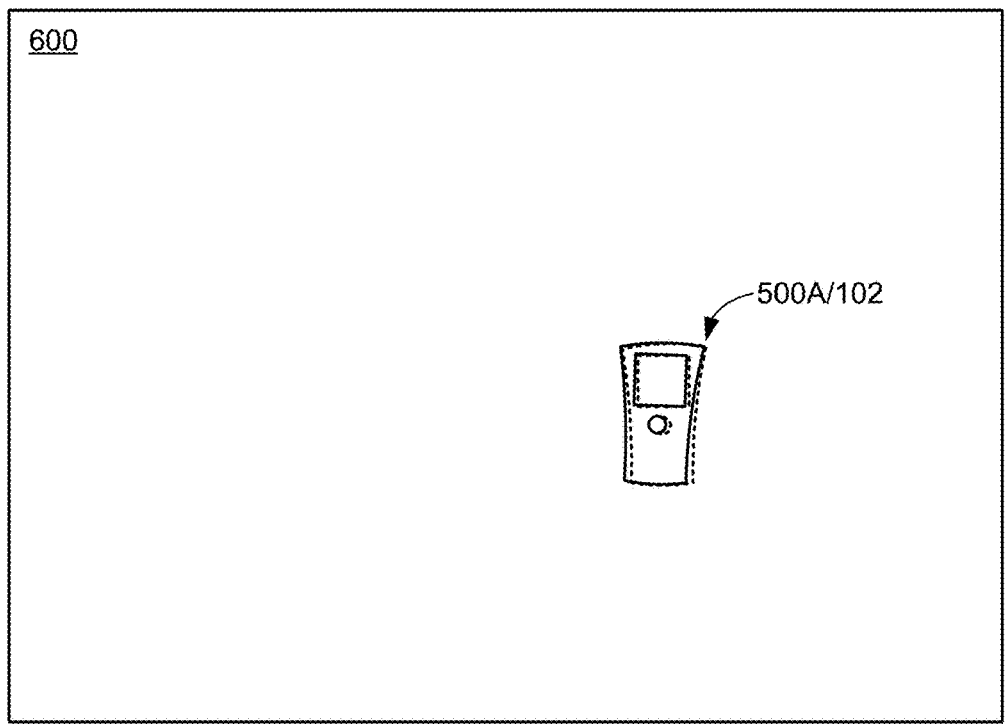
Figure 6C:
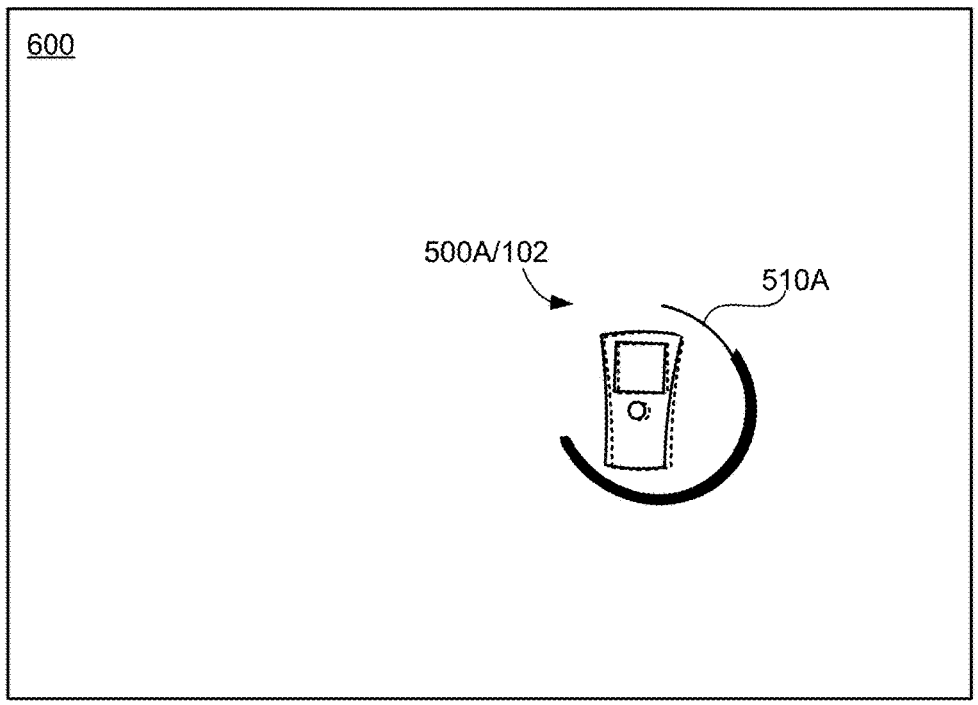
Figure 6D:
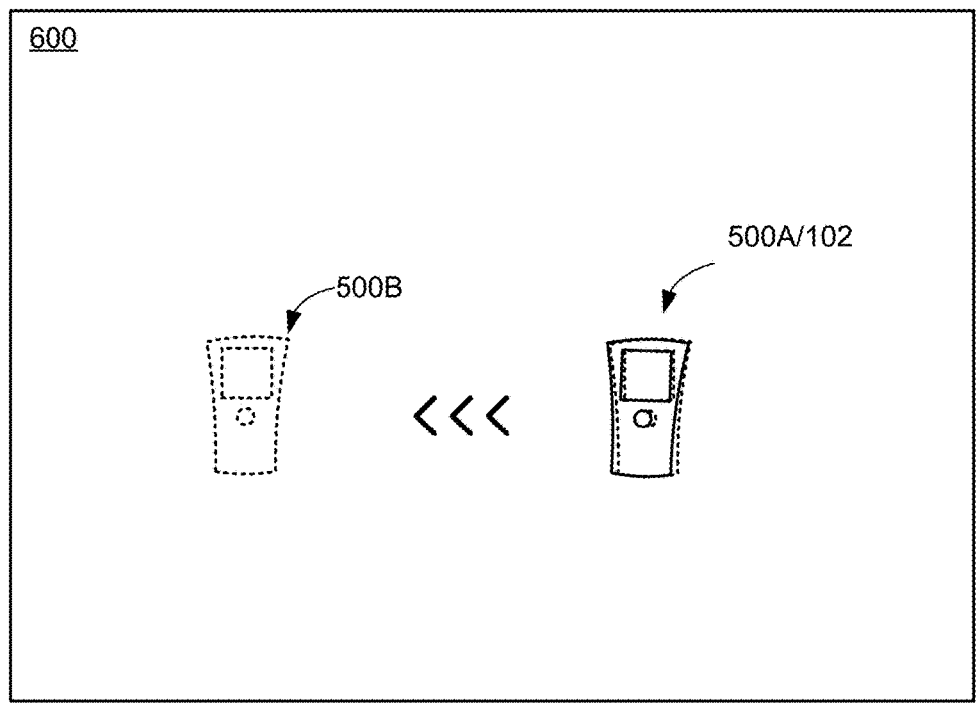
Figure 6E:
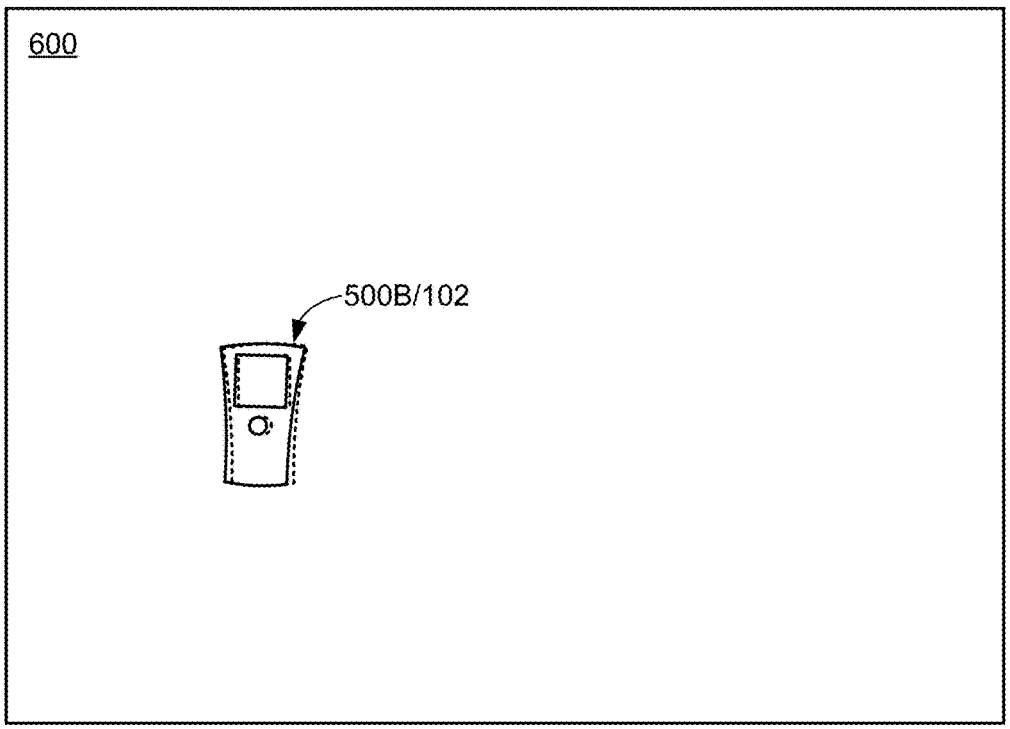
Figure 6F:
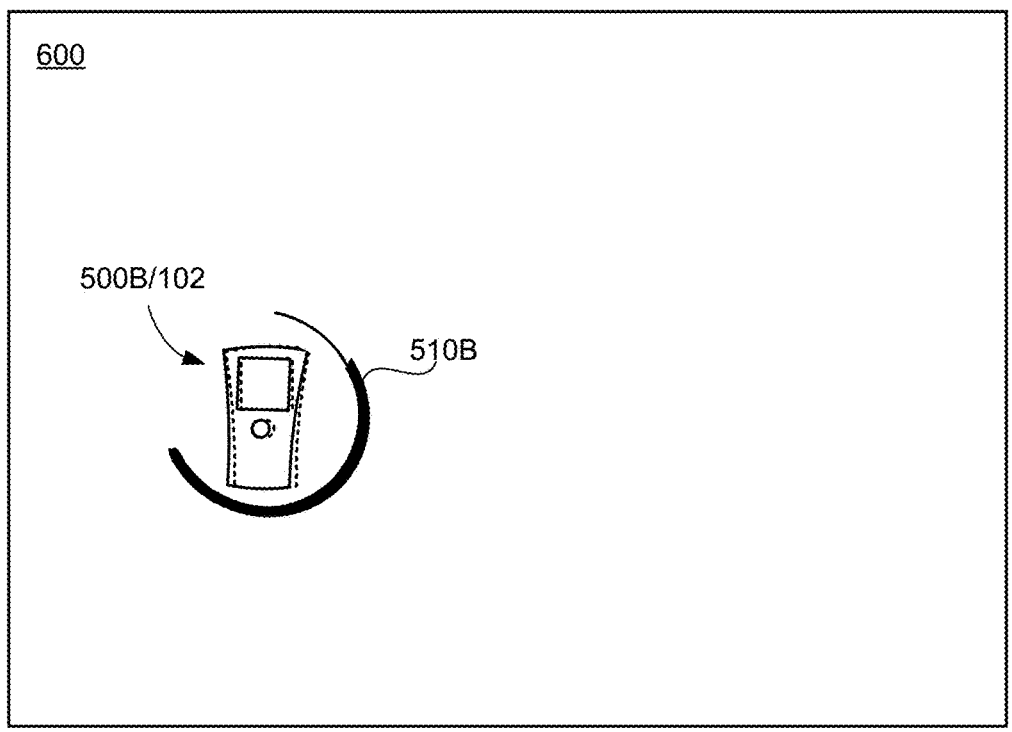
Figure 6G:
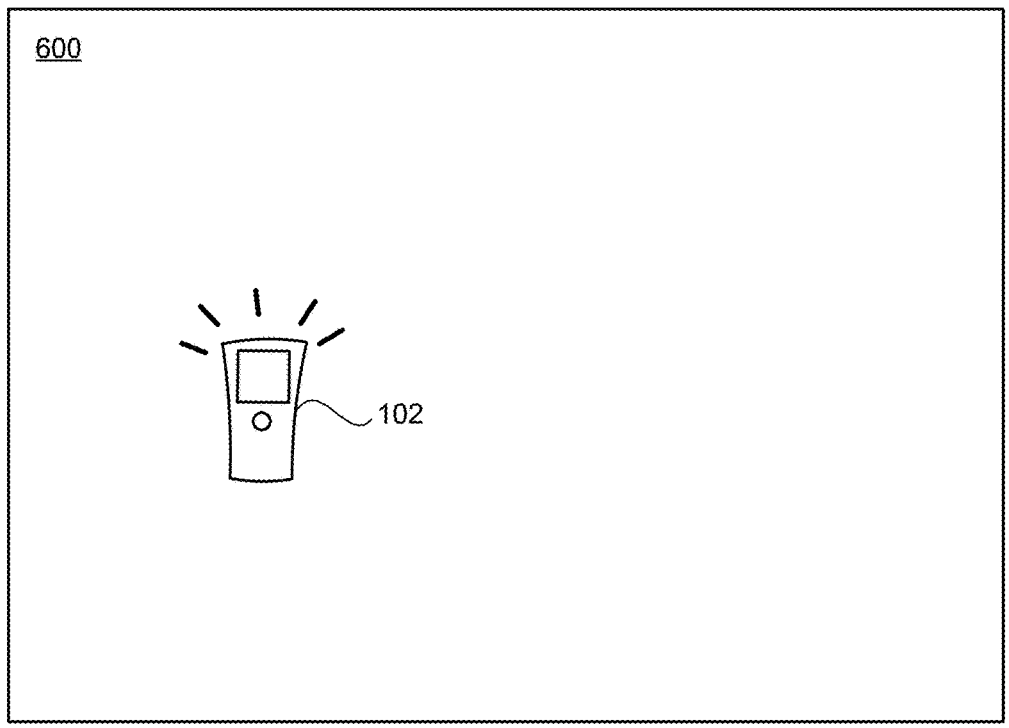

In some implementations, verification of the user's intention to pair the HMD 100 with the detected controller 102 may involve alignment of the detected controller 102 with multiple different virtual pairing indicators at multiple different virtual positions prior to completing the pairing of the controller 102 with the HMD 100, as illustrated in the first person views (i.e., the user's view of the virtual scene 600 of the virtual environment generated by the HMD 100 and displayed to and viewed by the user) of the virtual environment show in FIGS. 6A-6G. As shown in FIG. 6A, in response to initiation of the pairing mode (for example, detection of the controller 102 in the detection range of the HMD 100), a first virtual pairing indicator 500A at a first virtual location may indicate to the user that the controller 102 is within the detection range of the HMD 100 and is available for pairing with the HMD 100, and the user may initiate movement of the controller 102 toward the first virtual pairing indicator 500A. With the controller 102 aligned with the first virtual pairing indicator 500A, as shown in FIG. 6B, alignment may be maintained for a first set amount of time. Progress towards maintaining the alignment of the controller 102 with the first pairing indicator 500A for the first set amount of time may be displayed to the user by a first virtual progress indicator 510A, as shown in FIG. 6C. After the first set amount of time has elapsed with the controller 102 aligned with the first virtual pairing indicator 500A, the system may display a second virtual pairing indicator 500B, as shown in FIG. 6D, and the user may move the controller 102 from its aligned position with the first virtual pairing indicator 500A shown in FIG. 6C to an aligned position with the second virtual pairing indicator 500B, as shown in FIG. 6E. Alignment with the second virtual pairing indicator 500B may be maintained for a second set amount of time, with progress displayed to the user by a second virtual progress indicator 510B, as shown in FIG. 6G. After the second set amount of time has elapsed with the controller 102 aligned with the second virtual pairing indicator 500B, the designated pairing sequence may be completed, and the HMD 100 and controller 102 may be paired, enabling communication between the HMD 100 and the controller 102 as described above via, for example, Bluetooth, WiFi, or other communication available to the HMD 100 and the controller 102.

In the example shown in FIGS. 6A-6G, a series of two virtual pairing indicators 500A and 500B are shown, simply for ease of discussion and illustration. In some implementations, a series of more than two virtual pairing indicators may be used to confirm pairing of the controller 102 and the HMD 100. That is, in some implementations, the user may choose to require a single sustained alignment of the controller 102 with a single virtual pairing indicator 500, and/or multiple sustained alignments of the controller 102 with multiple virtual pairing indicators 500A-500N. In some implementations, the number of virtual pairing indicators required to complete the pairing sequence may be set by the user and/or may be adapted by the user based on, for example, a particular application being executed, a particular venue, and other such factors. In some implementations, the number of virtual pairing indicators required to complete the pairing sequence may be previously set by the manufacturer and/or adjusted by the user.

Figure 6H:
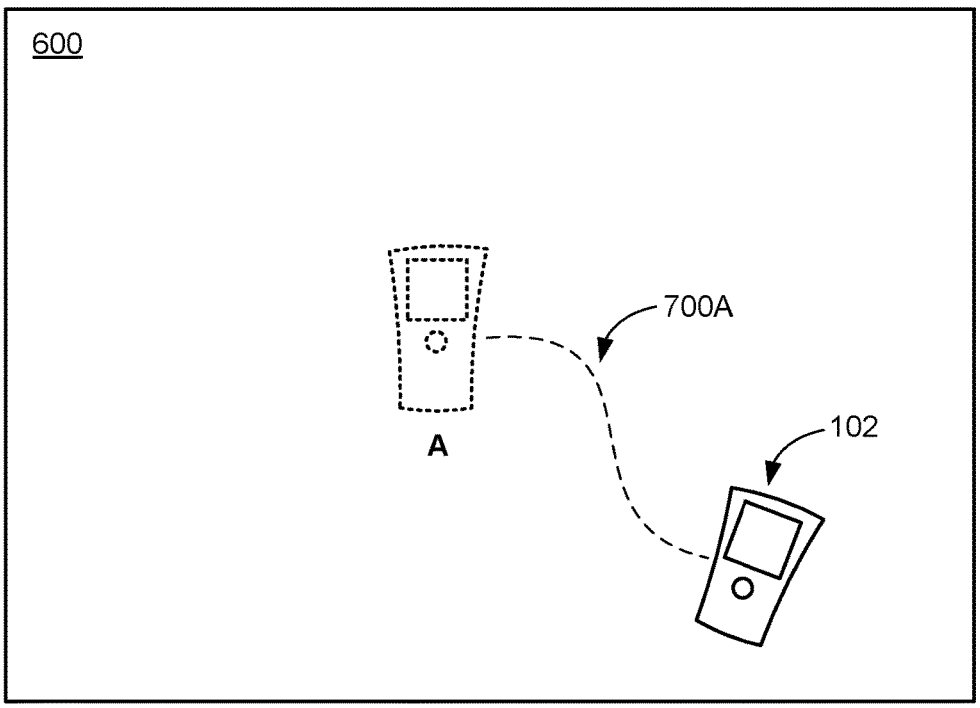

In some implementations, verification of the user's intention to pair the HMD 100 and the controller 102 may involve following a particular virtual pattern or virtual trace, or series of virtual patterns or virtual traces, generated by the HMD 100 and displayed by the HMD 100 in the virtual scene 600 displayed to the user in the virtual environment. For example, as shown in FIG. 6H, in response to detection of the controller 102 in the detection range of the HMD 100 as described above, a first virtual pattern indicator 700A may be displayed to the user, indicating a virtual path or virtual trace for the user to follow in moving the controller 102 to achieve pairing of the controller 102 and the HMD 100. As the 6DOF pose of the controller 102, for example, relative to the HMD 100, may be detected and tracked as the controller 102 moves relative to the HMD 100, the system may verify that the controller 102 has been moved along the prescribed virtual path identified by the first virtual pattern indicator 700A. Upon detected completion of the movement of the controller 102 along the virtual path defined by the virtual pattern indicator 700A, the HMD 100 and controller 102 may be paired, as shown in FIG. 6G, enabling communication between the HMD 100 and the controller 102 as described above via, for example, Bluetooth, WiFi, or other communication available to the HMD 100 and the controller 102.

Figure 6I:
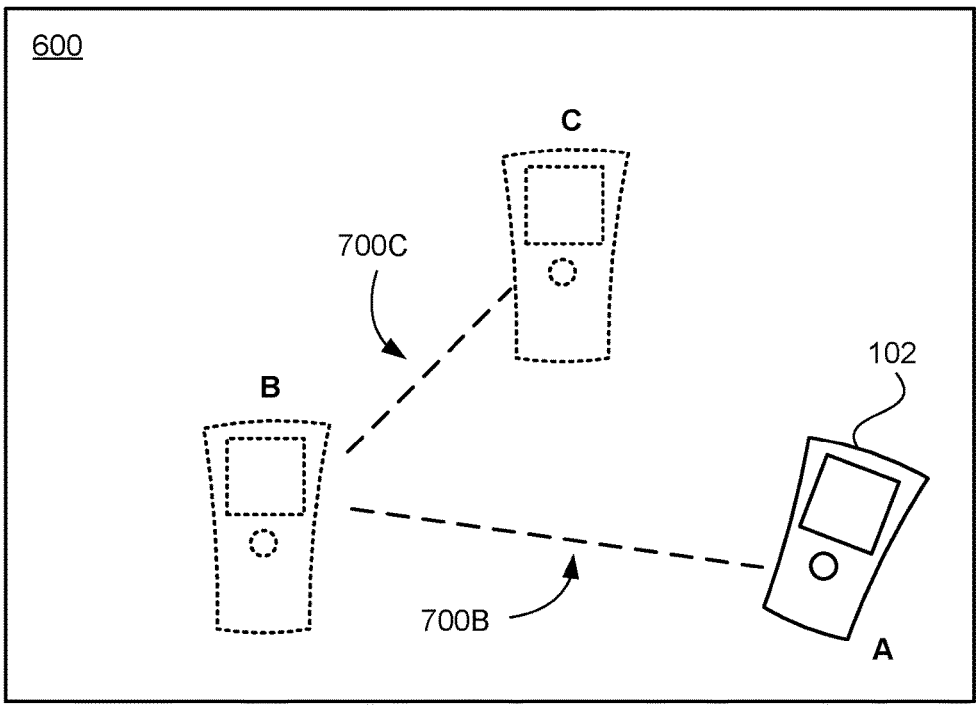

In some implementations, multiple virtual pattern indicators may be generated and displayed to the user by the HMD 100 for verification of pairing, as shown in FIG. 6I. For example, a first virtual pattern indicator 700B may be displayed to the user, indicating a first virtual path for the user to follow in moving the controller 102 from a first virtual position A to a second virtual position B. As the 6DOF post of the controller 102, for example, relative to the HMD 100, may be detected and tracked as the controller 102 moves relative to the HMD 100, the system may verify that the controller 102 has been moved along the prescribed virtual path identified by the first virtual pattern indicator 700B from the first virtual position A to the second virtual position B. From the second virtual position B, the user may then move the controller 102 along a virtual path defined by a second virtual pattern indicator 700C to a third virtual position C. Upon completion of the movement pattern defined by the virtual pattern indicators 700B and 700C, the HMD 100 and controller 102 may be paired, as shown in FIG. 6G, enabling communication between the HMD 100 and the controller 102 as described above via, for example, Bluetooth, WiFi, or other communication available to the HMD 100 and the controller 102.

In the example shown in FIGS. 6H and 6I, a virtual path defined by one, or a series of two virtual pattern indicators 700B and 700C is shown, simply for ease of discussion and illustration. In some implementations, a virtual path defined by a series of more than two virtual pattern indicators may be used to confirm pairing of the controller 102 and the HMD 100. That is, in some implementations, a single trace of the controller 102 along a single virtual path defined by a single virtual pattern indicator 700 may be used to confirm and complete pairing. In some implementations, multiple movements of the controller 102 along multiple virtual paths defined by multiple virtual pairing indicators 700A-700N may be used to confirm and complete pairing. In some implementations, the number of virtual pairing indicators required to complete the pairing sequence may be set by the user and/or may be adapted by the user based on, for example, a particular application being executed, a particular venue, and other such factors. In some implementations, the number of virtual pairing indicators required to complete the pairing sequence may be previously set by the manufacturer and/or adjusted by the user.

Figure 7:
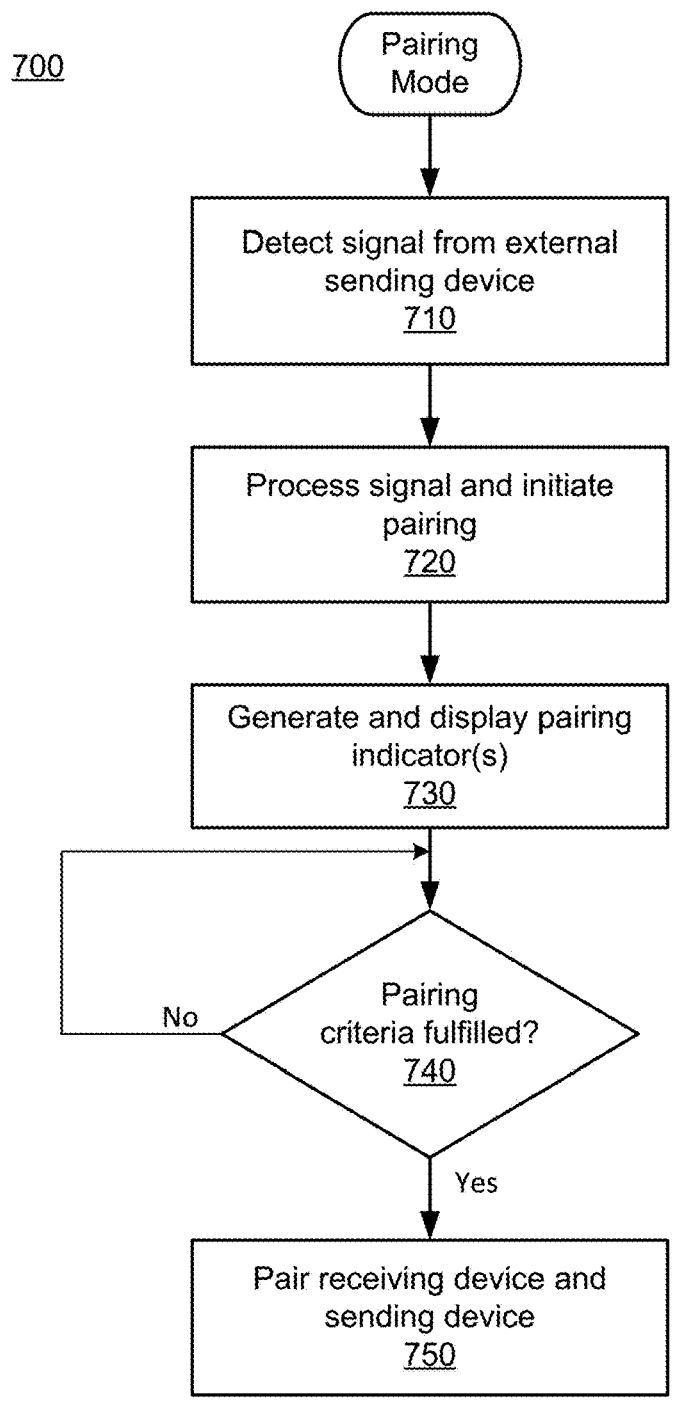
FIG. 7 is a flowchart of a method of pairing a first device and a second device in an augmented and/or a virtual reality environment, in accordance with implementations as described herein.

A method 700 of pairing devices in an augmented and/or virtual reality environment, in accordance with implementations described herein, is shown in FIG. 7. In the pairing mode, a signal, such as, for example, an electromagnetic signal may be detected by a receiving device such as an HMD worn by the user, indicating that a sending device, such as a controller operated by the user, is available and eligible for pairing with HMD based on properties of the electromagnetic signal transmitted by the controller and received and processed by the HMD (blocks 710 and 720). From the processed signal, the HMD may determine a physical proximity of the HMD and the controller, and may extract identification information associated with the controller to be used in pairing the HMD and the controller. Based on the information extracted from the electromagnetic signal, the HMD may generate and display one or more virtual pairing indicators (block 730). The one or more virtual pairing indicators may include one or more alignment indicators as shown in FIGS. 6A-6F, and/or one or more virtual pattern indicators as shown in FIGS. 6H and 6I. Upon determination that the pairing criteria has been fulfilled (block 740), the HMD and the controller may be paired (block 750). Determination of fulfillment of pairing criteria may include, for example, determining that the aligned position of the controller with the one or more virtual pairing indicators has been maintained for a set amount of time, as shown in FIGS. 6A-6F, and/or that movement of the controller has followed the one or more virtual pattern indicators, as shown in FIGS. 6G and 6H.

Returning to the example HMD, controller and system shown in FIGS. 2A-2C and 3, in some implementations, as shown in FIG. 2C, the example controller 102 included in the system and method described above may include a housing 103 in which internal components of the device 102 are received, and a user interface 104 on an outside of the housing 103, accessible to the user. The user interface 104 may include a plurality of different types of manipulation devices (not shown in detail in FIG. 2C) including, for example, touch sensitive surface(s) configured to receive user touch inputs, buttons, knobs, joysticks, toggles, slides and other such manipulation devices.

In some implementations, as shown in FIGS. 2A and 2B, the example HMD 100 included in the system and method described above may include a housing 110 coupled to a frame 120, with an audio output device 130 including, for example, speakers mounted in headphones, also be coupled to the frame 120. In FIG. 2B, a front portion 110a of the housing 110 is rotated away from a base portion 110b of the housing 110 so that some of the components received in the housing 110 are visible. A display 140 may be mounted on an interior facing side of the front portion 110a of the housing 110. Lenses 150 may be mounted in the housing 110, between the user's eyes and the display 140 when the front portion 110a is in the closed position against the base portion 110b of the housing 110. In some implementations, the HMD 100 may include a sensing system 160 including various sensors such as, for example, audio sensor(s), image/light sensor(s), positional sensors (e.g., inertial measurement unit including gyroscope and accelerometer), and the like. The HMD 100 may also include a control system 170 including a processor 190 and various control system devices to facilitate operation of the HMD 100.

In some implementations, the HMD 100 may include a camera 180 to capture still and moving images. The images captured by the camera 180 may be used to help track a physical position of the user and/or the controller 102 in the real world, or physical environment relative to the virtual environment, and/or may be displayed to the user on the display 140 in a pass through mode, allowing the user to temporarily leave the virtual environment and return to the physical environment without removing the HMD 100 or otherwise changing the configuration of the HMD 100 to move the housing 110 out of the line of sight of the user.

In some implementations, the HMD 100 may include a gaze tracking device 165 to detect and track an eye gaze of the user. The gaze tracking device 165 may include, for example, an image sensor 165A, or multiple image sensors 165A, to capture images of the user's eyes, for example, a particular portion of the user's eyes, such as, for example, the pupil, to detect, and track direction and movement of, the user's gaze. In some implementations, the HMD 100 may be configured so that the detected gaze is processed as a user input to be translated into a corresponding interaction in the immersive virtual experience.

As shown in the block diagram of FIG. 3, a system for pairing a first electronic device and a second electronic device, in accordance with implementations described herein, the first electronic device 300 may include a sensing system 360 and a control system 370, which may be similar to the sensing system 160 and the control system 170, respectively, shown in FIGS. 2A and 2B. The sensing system 360 may include one or more different types of sensors, including, for example, a light sensor, an audio sensor, an image sensor, a distance/proximity sensor, a positional sensor (e.g., an inertial measurement unit including a gyroscope and accelerometer) and/or other sensors and/or different combination(s) of sensors, including, for example, an image sensor positioned to detect and track the user's eye gaze, such as the gaze tracking device 165 shown in FIG. 2B. The control system 370 may include, for example, a power/pause control device, audio and video control devices, an optical control device, a transition control device, and/or other such devices and/or different combination(s) of devices. The sensing system 360 and/or the control system 370 may include more, or fewer, devices, depending on a particular implementation. The elements included in the sensing system 360 and/or the control system 370 may have a different physical arrangement (e.g., different physical location) within, for example, an HMD other than the HMD 100 shown in FIGS. 2A and 2B. The first electronic device 300 may also include a processor 390 in communication with the sensing system 360 and the control system 370, a memory 380, and a communication module 350 providing for communication between the first electronic device 300 and another, external device, such as, for example, the second electronic device 302.

The second electronic device 302 may include a communication module 306 providing for communication between the second electronic device 302 and another, external device, such as, for example, the first electronic device 300. In addition to providing for the exchange of data between the first electronic device 300 and the second electronic device 302, the communication module 306 may also be configured to emit a ray or beam as described above. The second electronic device 302 may include a sensing system 304 including an image sensor and an audio sensor, such as is included in, for example, a camera and microphone, an inertial measurement unit, a touch sensor such as is included in a touch sensitive surface of a controller, or smartphone, and other such sensors and/or different combination(s) of sensors. A processor 309 may be in communication with the sensing system 304 and a control unit 305 of the second electronic device 302, the control unit 305 having access to a memory 308 and controlling overall operation of the second electronic device 302.

Figure 8:
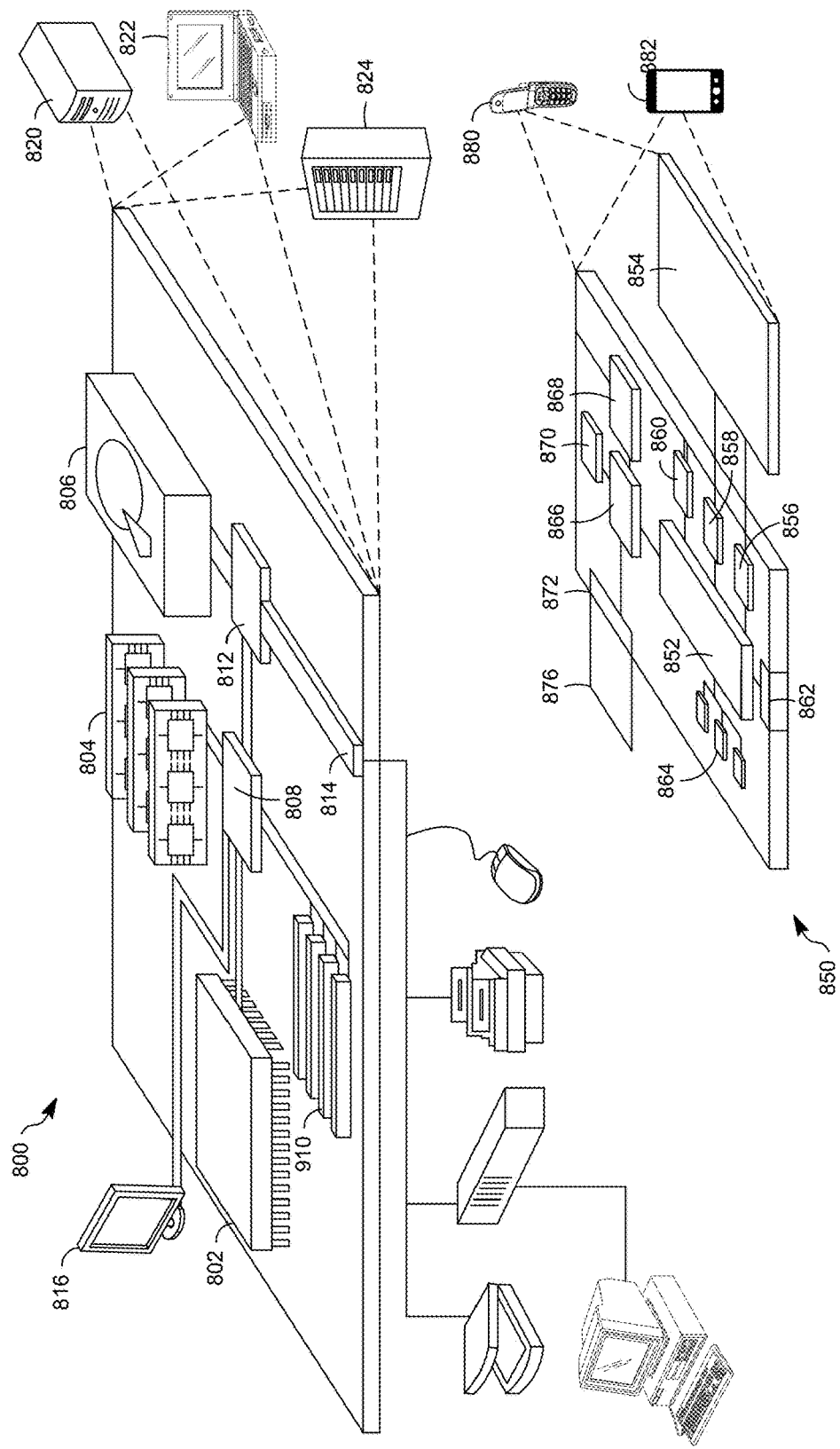
FIG. 8 shows an example of a computer device and a mobile computer device that can be used to implement the techniques described herein.

FIG. 8 shows an example of a generic computer device 800 and a generic mobile computer device 850, which may be used with the techniques described here. Computing device 800 is intended to represent various forms of digital computers, such as laptops, desktops, tablets, workstations, personal digital assistants, televisions, servers, blade servers, mainframes, and other appropriate computing devices. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. The processor 802 can be a semiconductor-based processor. The memory 804 can be a semiconductor-based memory. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device (computer-readable medium), for processing by, or to control the operation of, data processing apparatus, e.g., a programmable processor, a computer, or multiple computers. Thus, a computer-readable storage medium can be configured to store instructions that when executed cause a processor (e.g., a processor at a host device, a processor at a client device) to perform a process.

A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer implemented method, comprising:
    detecting, by a head mounted device, a signal transmitted by a handheld device;
    processing, by a processor of the head mounted device, the detected signal to detect a relative proximity of the head mounted device and the handheld device;
    displaying, on a display of the head mounted device, a virtual object representing a virtual pairing indicator in response to the processing of the detected signal;
    detecting a movement of the handheld device relative to a displayed position of the virtual pairing indicator based on the signal transmitted by the handheld device; and
    pairing the head mounted device and the handheld device based on the detected movement of the handheld device relative to the displayed position of the virtual pairing indicator.

2. The method of claim 1, wherein displaying, on the display of the head mounted device, the virtual pairing indicator in response to the processing of the detected signal includes:
    generating a rendered image defining a virtual alignment area; and
    displaying the rendered image as the virtual object in a virtual environment displayed on the display of the head mounted device.

3. The method of claim 2, wherein generating the rendered image includes:
    generating a three dimensional rendered image corresponding to at least one feature of the handheld device; and
    displaying the three dimensional rendered image as the virtual object in the virtual environment displayed on the display of the head mounted device, for alignment of the handheld device in the virtual alignment area.

4. The method of claim 2, wherein detecting the movement of the handheld device relative to the displayed position of the virtual pairing indicator includes:
    detecting an initial position and an initial orientation of the handheld device relative to the head mounted device;
    tracking movement of the handheld device relative to the head mounted device; and
    detecting an alignment of the handheld device with the virtual alignment area defined by the display of the virtual pairing indicator based on the tracked movement of the handheld device relative to the head mounted device.

5. The method of claim 4, wherein pairing the head mounted device and the handheld device based on the detected movement of the handheld device relative to the virtual pairing indicator includes:
    monitoring the alignment of the handheld device in the virtual alignment area; and
    receiving verification of an input to pair the head mounted device and the handheld device in response to detecting the alignment of the handheld device with the virtual alignment area for greater than or equal to a set amount of time.

6. The method of claim 5, further comprising pairing the head mounted device and the handheld device and enabling communication between the head mounted device and the handheld device in response to receiving the verification of the input to pair the head mounted device and the handheld device.

7. The method of claim 1, wherein displaying, on the display of the head mounted device, the virtual pairing indicator in response to the processing of the detected signal includes:
generating a pattern defining a virtual path; and
displaying the virtual path as the virtual object in a virtual environment displayed on the display of the head mounted device.

8. The method of claim 7, wherein pairing the head mounted device and the handheld device based on the detected movement of the handheld device relative to the displayed position of the virtual pairing indicator includes:
tracking movement of the handheld device relative to the head mounted device;
mapping the tracked movement of the handheld device to a position and an orientation of the handheld device relative to the virtual path displayed on the display of the head mounted device;
monitoring alignment of the handheld device along the displayed virtual path; and
receiving verification of an input to pair the head mounted device and the handheld device in response to detected alignment of the handheld device along the displayed virtual path, from a first end of the virtual path to a second end of the virtual path.

9. The method of claim 8, further comprising pairing the head mounted device and the handheld device, and enabling communication between the head mounted device and the handheld device, in response to receiving the verification of the input to pair the head mounted device and the handheld device.

10. The method of claim 1, wherein detecting, by the head mounted device, the signal transmitted by the handheld device includes:
detecting, by the head mounted device, an electromagnetic signal transmitted by the handheld device, the electromagnetic signal including position data and orientation data related to the handheld device.

11. The method of claim 10, wherein the electromagnetic signal includes identification information related to the handheld device.

12. The method of claim 1, wherein detecting, by the head mounted device, the signal transmitted by a handheld device includes:
detecting, by the head mounted device, an acoustic signal transmitted by the handheld device, the acoustic signal including position data and orientation data related to the handheld device, and identification information related to the handheld device.

13. A computing device, comprising:
a head mounted device configured to display a virtual environment on a display thereof, the head mounted device including:
a memory storing executable instructions; and
a processor configured to execute the instructions, to cause the computing device to:
detect a signal transmitted by a handheld device;
process the detected signal to detect a relative proximity of the head mounted device and the handheld device;
display a virtual object representing a virtual pairing indicator on the display of the head mounted device in response to the processing of the detected signal;
detect a movement of the handheld device relative to a displayed position of the virtual pairing indicator on the display of the head mounted device based on the signal transmitted by the handheld device; and
pair the head mounted device and the handheld device based on the detected movement of the handheld device relative to the displayed position of the virtual pairing indicator.

14. The device of claim 13, wherein the virtual object representing the virtual pairing indicator includes a three dimensional rendered image corresponding to at least one feature of the handheld device, the three dimensional rendered image being displayed on the display of the head mounted device.

15. The device of claim 14, wherein, in pairing the head mounted device and the handheld device based on the detected movement of the handheld device relative to the displayed position of the virtual pairing indicator, the instructions also cause the computing device to:
detect an alignment of the handheld device in a virtual alignment area defined by the virtual pairing indicator;
monitor the alignment of the handheld device in the virtual alignment area;
detect verification of an input to pair the head mounted device and the handheld device in response to detected alignment of the handheld device in the virtual alignment area for greater than or equal to a set amount of time; and
pair the head mounted device and the handheld device to enable communication between the head mounted device and the handheld device in response to receiving verification of the input to pair the head mounted device and the handheld device.

16. The device of claim 13, wherein the virtual object representing the virtual pairing indicator includes a virtual path generated by the head mounted device, the virtual path being displayed on the display of the head mounted device.

17. The device of claim 16, wherein, in pairing the head mounted device and the handheld device based on the detected movement of the handheld device relative to the displayed position of the virtual pairing indicator, the instructions also cause the computing device to:
monitor alignment of the handheld device along the displayed virtual path;
receive verification of an input to pair the head mounted device and the handheld device in response to detected alignment of the handheld device along the virtual path from a first end of the virtual path to a second end of the virtual path; and
pair the head mounted device and the handheld device to enable communication between the head mounted device and the handheld device after receiving the verification of the input to pair the head mounted device and the handheld device.

18. The device of claim 13, wherein, in detecting, by the head mounted device, a signal transmitted by the handheld device, the instructions cause the computing device to:
detect, by the head mounted device, an electromagnetic signal transmitted by the handheld device, the electromagnetic signal including position data and orientation data related to the handheld device.

19. The device of claim 18, wherein the electromagnetic signal includes identification information related to the handheld device.

20. The device of claim 13, wherein, in detecting, by the head mounted device, a signal transmitted by the handheld device, the instructions cause the computing device to:
   detect, by the head mounted device, an acoustic signal transmitted by the handheld device, the acoustic signal including position data and orientation data related to the handheld device, and identification information related to the handheld device.

* * * * *